G. W. TUCKER.
Drawer-Pull.
No. 196,606. Patented Oct. 30, 1877.
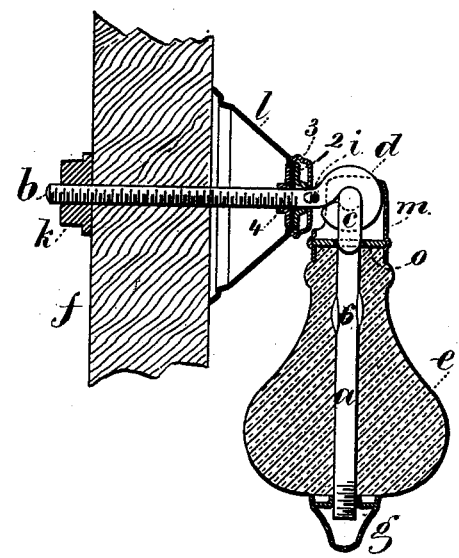

UNITED STATES PATENT OFFICE.

GEORGE W. TUCKER, OF WATERBURY, CONNECTICUT.

IMPROVEMENT IN DRAWER-PULLS.

Specification forming part of Letters Patent No. 196,606, dated October 30, 1877; application filed August 20, 1877.

*To all whom it may concern:*

Be it known that I, GEORGE W. TUCKER, of Waterbury, in the State of Connecticut, have invented an Improvement in Drawer-Pulls, of which the following is a specification:

This invention is an improvement upon that for which Letters Patent No. 190,527 were granted to me, the present devices relating to means for strengthening and securing the rose or cone and the screw-bolt, and for preventing the knob being turned upon its screw bolt or spindle and becoming loose.

In the drawing, Figure 1 is a vertical section of the pull. Fig. 2 is an end view of the knob-cap.

The spindles or bolts $a\,b$ are linked together, and pass through the knob $e$ and draw-front $f$, respectively, and are secured by the nuts $g$ and $k$, as in aforesaid patent.

The cone or rose $l$ is closed at its outer end, except a hole for the bolt $b$, and there is a washer, 2, within the cap 3, which washer 2 is preferably conical, so as to transfer the pressure from the shoulders $i$ to the cone or rose $l$, and the bolt $b$ is provided with a screw-thread throughout its length, to receive the secondary nut and washer 4, that holds the parts of the rose and spindle together.

The cap $m$ is made polygonal, to adapt it to the eyes $c\,d$ of the joint as they are interlocked. This cap receives and covers the eye $c$, the same being between the opposite angles of the square part of the cap, and the eye $d$ being between the other two angles of the square; but the cap is cut out to allow for the movement of the knob. This polygonal cap retains the parts of the joint in their proper relative positions, and it is ornamental.

The washer $o$ is employed as in said patent; but the bolt $a$ is prevented from turning in the knob $e$, or the knob from turning upon the bolt, by projections upon the bolt.

It is preferable to compress the metal of the bolt at opposite sides, to throw out flattened fins 6 6, that embed themselves into the wood of the knob as the bolt is driven into the knob, so as to prevent the knob turning upon the spindle; but the metal of the bolt $a$, at the base of the eye, may be so shaped as to extend double into the wood of the knob for a sufficient distance to prevent the knob being turned on the bolt, either accidentally or designedly, and thereby prevent the knob becoming loose or unscrewed.

I claim as my invention—

1. In combination with the bolt $b$ and rose or cone $l$, the cap 3, washer 2, and auxiliary nut 4, for the purposes and as set forth.

2. In combination with the eyes $c\,d$ of the bolts $a\,b$, the cap $m$, made polygonal to receive the eye $c$ between its opposite angles, and slotted for the bolt of the eye $d$, which eye is between the other two opposite angles of the cap, substantially as set forth.

3. In combination with the joint of the drawer-pull and the nut $g$, the projections upon the bolt $a$, entering the wood of the drawer-pull, to prevent the latter turning upon the former, as set forth.

Signed by me this 14th day of August, A. D. 1877.

G. W. TUCKER.

Witnesses:
 HENRY M. STOCKING,
 BARTOLO D'AUBIGNÉ.